United States Patent
Neervoort et al.

(10) Patent No.: US 6,701,525 B1
(45) Date of Patent: Mar. 2, 2004

(54) METHOD FOR OPERATING AN AUDIO/VIDEO SET AS BASED ON HIERARCHICAL MENUING OF SELECTABLE BULLETIZED AND STRINGED ITEMS AND AN AUDIO/VIDEO SET ARRANGED FOR PRACTICING THE METHOD

(75) Inventors: Paulus C. Neervoort, Eindhoven (NL); Guy J. Roberts, Eindhoven (NL); Michael Heesemans, Eindhoven (NL); Sung H. Kim, New Haven, CT (US); Edwin P. G. Van Vianen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/240,570

(22) Filed: Jan. 29, 1999

(30) Foreign Application Priority Data

Jan. 30, 1998 (EP) .............................................. 98200278

(51) Int. Cl.⁷ .............................. H04N 5/445; G06F 3/00
(52) U.S. Cl. ........................... 725/38; 725/59; 345/810; 345/841; 345/843
(58) Field of Search .................... 725/36, 38, 39, 725/40, 44, 52; 345/841, 843, 853, 854, 810, 825, 828, 830, 840, 861, 833, 858, 856, 857

(56) References Cited

U.S. PATENT DOCUMENTS

| | | | | |
|---|---|---|---|---|
| 5,319,385 A | * | 6/1994 | Aires | 345/156 |
| 5,574,494 A | | 11/1996 | Marics | 348/13 |
| 5,682,488 A | * | 10/1997 | Gleason et al. | 345/833 |
| 5,737,557 A | * | 4/1998 | Sullivan | 345/765 |
| 5,767,919 A | * | 6/1998 | Lee et al. | 725/37 |
| 5,781,247 A | * | 7/1998 | Wehmeyer et al. | 348/569 |
| 5,917,492 A | * | 6/1999 | Bereiter et al. | 345/357 |
| 5,930,474 A | * | 7/1999 | Dunworth et al. | 395/200.47 |
| 5,977,972 A | * | 11/1999 | Bates et al. | 345/341 |
| 6,014,140 A | * | 1/2000 | Strand | 345/684 |
| 6,111,561 A | * | 8/2000 | Brandau et al. | 345/121 |
| 6,262,722 B1 | * | 7/2001 | Allison et al. | 345/327 |
| 6,266,098 B1 | * | 7/2001 | Cove et al. | 348/563 |
| 6,317,142 B1 | * | 11/2001 | Decoste et al. | 345/762 |
| 6,377,254 B1 | * | 4/2002 | Sakaguchi | 345/810 |
| 6,404,446 B1 | * | 6/2002 | Bates et al. | 345/854 |

OTHER PUBLICATIONS

Microsoft Press, Computer Dictionary 1997, Microsoft Press, Third Edition, pp. 67 and 389.*

IBM Technical Disclosure Bulletin "Hierarchical Menu Display Structure", vol. 34, No. 8, p. 432–433, Jan. 1992.

* cited by examiner

*Primary Examiner*—John Miller
*Assistant Examiner*—Annan Q. Shang
(74) *Attorney, Agent, or Firm*—Gregory L. Thorne

(57) ABSTRACT

An audio/video set is operated with hierarchical menus. It displays a menu string of first items in a first coordinate direction on the screen and detects a user selecting an item thereamong. Upon so detecting, the set displays a menu string of second items in a coordinate direction transverse to the first direction and through the selected item. It detects user selection among the second items for activating an associated television functionality. It displays the items in a bulletized manner as annotated by supporting indicativity.

11 Claims, 3 Drawing Sheets

METHOD FOR OPERATING AN AUDIO/VIDEO SET AS BASED ON HIERARCHICAL MENUING OF SELECTABLE BULLETIZED AND STRINGED ITEMS AND AN AUDIO/VIDEO SET ARRANGED FOR PRACTICING THE METHOD

BACKGROUND OF THE INVENTION

Field of the Invention

The invention relates to a method for operating an audio/video set as based on hierarchical menuing, the method comprising displaying a first menu string of selectable first items in a first coordinated direction on a screen and detecting user selection among the first items. The invention further relates to an audio/video set encompassing a display arranged according to practice this method.

Examples of such audio/video sets are television sets, HiFi sets, recorders, disc players, etc., inclusive of set-top boxes, remote control devices and similar devices associated to such sets, and hybrid sets, such as, a combination of a TV and a VCR, or with still other devices.

Description Of The Related Art

Various categories of the above, such as television sets, are notoriously difficult to operate and, in particular, to program. The number of television channels, functionality modes, parameter settings, image subdivisions, recorder functions and others, are great enough to embarrass most non-professional users. Applicants have experienced that for optimally guiding a user, a limited but explicit amount of on-screen text should be available. Similar arguments apply to various other categories of such audio/video sets. Moreover, nonuniformity among such categories is being experienced by a user as annoying.

By itself, IBM TDB Vol 34, No.8, p.432–433, January 1992 gives a hierarchical menu structure with bulletized strings disposed in vertical and horizontal directions, but absence therein of further displayed specifying information renders such menu little useful for controlling a specific device like an audio/video set for household use.

SUMMARY OF THE INVENTION

In consequence, among others, it is an object of the present invention to provide a better concept for a graphics-based screen layout principle for controlling and/or programming an audio/video set for household use, this concept being straightforwardly translatable among various categories of such sets. Now, therefore, according to one aspect, the invention is characterized by the steps of, under control of said detecting of a selected first item, displaying a second menu string of one or more selectable second items in a second coordinated direction on the screen transverse to said first direction and intersecting the first string at the selected first item; detecting user selection among the second items for activating an associated audio/video functionality; and displaying said items in a bulletized manner while annotating by supporting indicativity.

The coordinate directions are often substantially perpendicular to each other, but this is not an express limitation. In principle, there may be three or more coordinate directions within the display plane. The bulletized display may, for each item, realize the associated bullet as a relatively dark disk. Other graphical elements are useful as well, such as diamonds, asterisks, etcetera. The elements may have a uniform shape, but this is not a strict requirement, certain elements may get some highlighting, coloring or enlargement. Even a certain amount of iconizing may be useful. The bulletizing may then indicate localizing and stringing of the items in question. The strings will often be straight, but some curvature could be allowed as well. Now, a particularly instructive element has proven to be the so-called puck, which may contain up to four sectors that may each selectively be "pushed away" upon user-actuation of the item in question: coexistently with this pushing, further information is then joined to the actuated item, whereby a further selecting or actuating may be effected by the user. Further supporting indicativity may be used in the form of an icon, one or more words, or other appropriate, space-saving identifiers.

BRIEF DESCRIPTION OF THE DRAWINGS

These and further aspects and advantages of the invention will be discussed more in detail hereinafter with reference to the disclosure of preferred embodiments, and in particular with reference to the accompanying drawings, in which.

DESCRIPTION OF THE PREFERRED EMBODIMENTS

Hereinafter, a list of design concept principles is presented. The controls are as much as possible put into a functional context: they appear only when the function wherein they are used becomes active. For instance, Teletext buttons are only placed on the screen when Teletext is active. Generally, the number of keys on the remote control device may remain unchanged, but in certain cases, a few remote control buttons may migrate to onscreen buttons. Also, new functions may be created on-screen without introducing them on the remote control device. Generally, remote control will have only the most frequently used functions.

In general, functionality has been divided over four levels: Remote Control Elements, On-screen Buttons, Primary Menu Items, and finally Secondary Menu Items that are hidden behind a so-called 'More' item. In this manner, certain functions may be made easily accessible, whereas others are more or less hidden deeper in the hierarchy. It is not necessary that every set category has been provided with all four levels: this depends on the type, size, and complexity of the category or set in question.

Accessing of the content of a button or icon is fast and easy. The navigation is adaptable to a free moving or jumping so-called "puck" element with a pointing-and-clicking feature. On-the-spot information may be activated through a specific key. When a user selects a particular item, this item will immediately present its sub-items, without a necessity for further "clicking". A user's past selection path remains displayed on-screen for facilitating a way back. Alternative but non-selected items of this path will disappear to reduce screen pollution. Furthermore, items previous and next remain both displayed, so that a user may easily go forward and backward in the menu structure. For navigation proper, no secondary confirmation is necessary.

Figure 1:
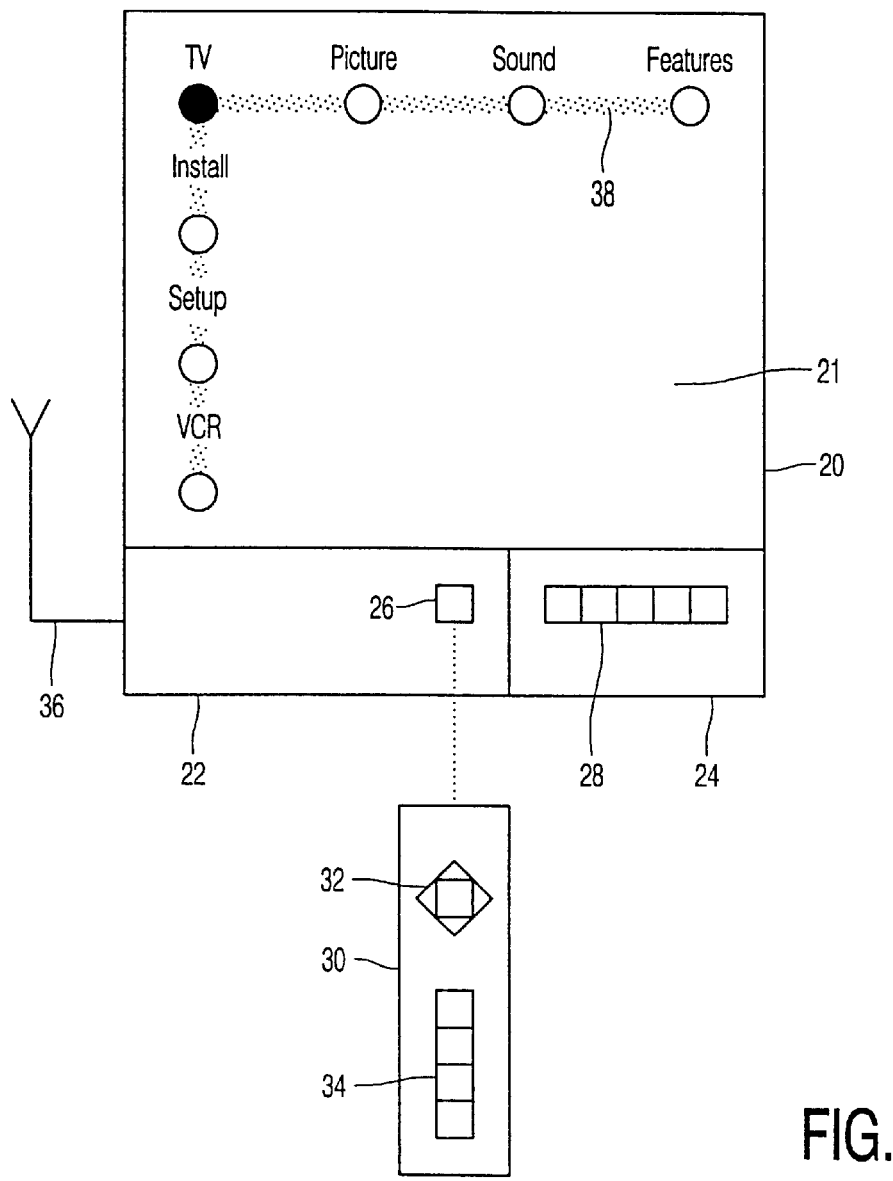
FIG. 1 shows a basic TV environment of the invention.

FIG. 1 shows a basic TV environment of the invention. For other audio/video set types, functionality translation is straightforward. TV set 20 has video signal receiving means such as antenna 36, a section 24 for containing buttons 28 for manual user actuation, and a driver section 22 symbolizing in-set electronics. This section 22 furthermore has a signal port 26 for communicating wireless signals with a remote control device 30. Speech control input and response output could be a useful feature. Remote Control Device 30 includes cursor controls 32 and further controls 34. An upper section 21 of the TV set 20 includes; 38 having a row of bulletized items including bullets for TV, Picture, Sound and Features, and, furthermore, a column of bulletized items including bullets for TV, Install, Setup and VCR. For other types of devices and functions, a similar set of items would be provided. Through selection, the TV bullet at the intersection of the row and column has been displayed in a highlighted manner. Moving the highlighting away from the "TV"-bullet along either the row or the column to another item may cause a different bullet string to unroll from the other item than the original one if, for such other item, also a string had indeed been provided. The earlier string will then disappear.

Figure 2:
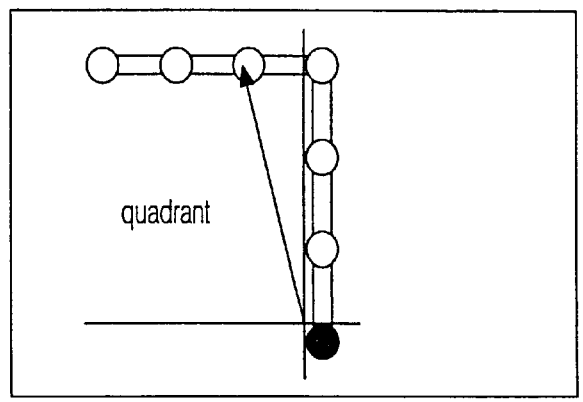
FIG. 2 shows the principle of diagonal cursor movement.

FIG. 2 shows the principle of diagonal cursor movement. The user may only navigate to items that are visible and available on screen. The behavior of the selected widget or item has always precedence over the generic diagonal navigation. Thus, cursor behavior may be specified within the particular widget. If not, then the generic navigation takes over. When the cursor is controlled in a slanted manner, it will move towards the item that is closest within the quadrant or otherwise appropriate angular area associated to that direction.

Figure 3:
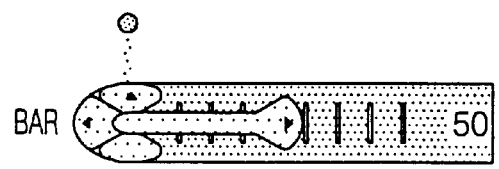
FIG. 3 shows an example of a BAR.

FIG. 3 gives an example of a particular tool, in this case a BAR, that is generally used for controlling a value for a particular function. When the function is selected, the puck-shaped cursor "pushes" one of its four segments away and transforms into a bar with a range of 0 to 100% of the adjustable value. Generally, the transformed cursor indicates the applicable type of tool, and also the manner to control it. If, in the situation shown, a user will actuate cursor control to West or East, the bar will immediately begin to change its value as long as the cursor control is kept actuated in that direction. During this movement, the navigation support arrow on the side remains highlighted.

Figure 4:
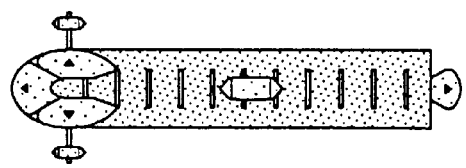
FIG. 4 shows an example of a slider.

FIG. 4 shows an example of another tool, in this case a slider that is used when a function needs "balancing". Upon selection of the function, the cursor puck will in similar manner as shown with reference to FIG. 3, transform into a slider with a range between −50% and +50% of the adjustable value, with a clear visual midpoint at 0%. If, in the situation shown a user will actuate cursor control to West or East, the slider immediately begins to change its value in that direction as long as the cursor control is kept actuated. During this movement, the navigation support arrow on that side remains highlighted. A number will be added when the slider or bar in question is actually applied in the interface in question. This has been shown in FIG. 3. Both slider and bar provide immediate feedback of any change: feedback is fast, and a direct mapping exists between the adjusted value and graphic feedback. Bars and sliders may run in any other coordinate direction.

Figure 5A:
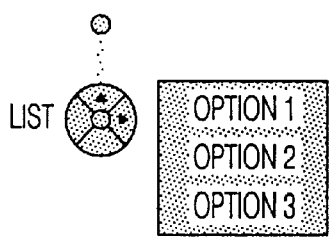
FIGS. 5A and 5B show two examples of a list.
Figure 5B:
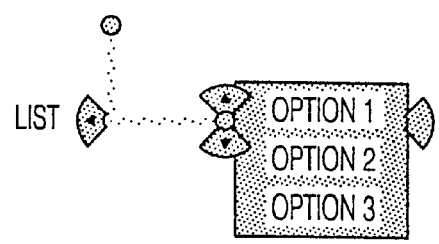

FIGS. 5A, 5B give a further tool, in this case, two examples of lists for letting a user person select among a series of options of which only one may be active at a time (FIG. 5A). When a function is selected, its options show immediately in the list. By moving East, the cursor enters the list at the Default Selection (FIG. 5B), which may be replaced by the most recent setting. This entering may influence the actual setting of the device in a corresponding manner. Similarly, moving the cursor North or South makes the list move South and North, respectively. When a particular option has been selected, moving West operates to confirm and to return again to the next higher level.

Figure 6A:
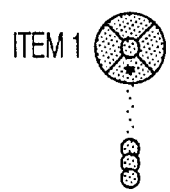
FIGS. 6A and 6B show two examples of a "more" item.
Figure 6B:
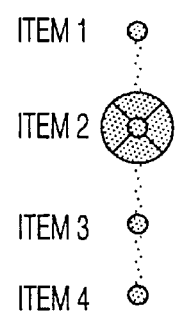

FIGS. 6A, 6B show two examples of a superbulletized or "more" item. Here, its shape (FIG. 6A), as a plurality of quasi superimposed bullets, suggests availability of various further items. Other shapes of the item are feasible as well. When the cursor is moved South, the "more" item unfolds and reveals the further items (FIG. 6B). The "more" feature is used for long menu rows or columns that would extend beyond an available or otherwise predetermined screen area, or if a need has been felt to keep the screen more "clean". A "more" item may lie at either end or at both ends of a menu string. When the cursor moves to the "more" item, all or part of the hidden items will show up, and some or all of the earlier items may in turn be squeezed or wrapped up into a new or already existing "more" item. In all cases, the displaying of a string is effected by a kind of dynamical "unrolling", so that items that are closer to the origin will be shown earlier in time than items that lie further away. This has been found to give a user the idea of commonality among the items of the string in question.

Figure 7:
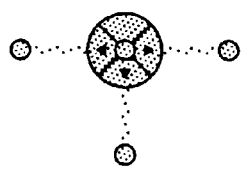
FIG. 7 shows an example of navigation support arrows.

FIG. 7 shows an example of navigation support arrow displayed here on the puck-shaped bullet to indicate which directions a user person may take, with respect to navigating to other bullets, and also for effecting control, such as, on a bar device or slider device. Such navigation arrow is a first-level on-screen help. In the embodiment shown, three directions are allowed, but Northward is blocked.

Figure 8A:
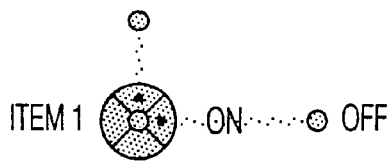
FIG. 8 shows an example of a Boolean TOGGLE.
Figure 8B:
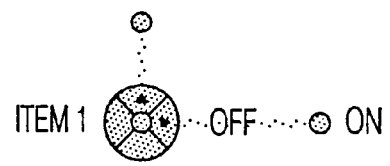

FIG. 8 shows an example of another tool, in this case of a Boolean TOGGLE, which is used for a function that has only two levels. In the embodiment, user actuation will activate the default state of the toggle; in this layout, moving the cursor East will activate the other setting, which is swapped in position with the previously selected setting. Such swapping may be repeated.

Figure 9:
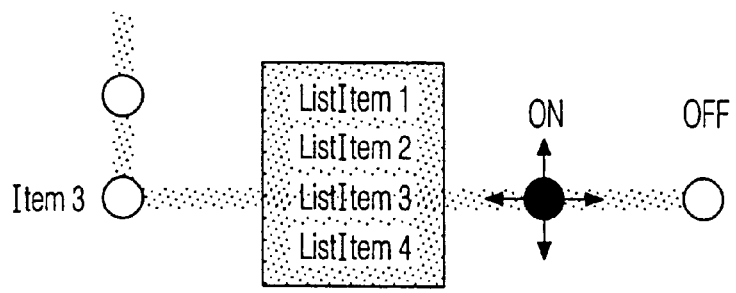
FIG. 9 shows an example of a Selection List Mechanism.

FIG. 9 shows an example of a still further tool, in this case, of a Selection List Mechanism. This widget is a combination of a list mechanism with other widgets. It may be a further list, a Boolean Toggle, or an on-screen Button, which by themselves do not require both East and West navigation. The difference with a standard list is that here the items need not be mutually exclusive. The difference with a sub-menu is that the selection of the item in the list already implies a setting, whereas in a normal menu, selecting an item that itself has a submenu does not set anything.

What is claimed is:

1. A method for operating an audio/video set as based on hierarchical menuing, said method comprising the steps:
   displaying a first menu string of selectable first items in a first coordinated direction on a screen; and
   detecting user selection among said selectable first items, characterized in that said method further comprises the steps of:
   a. displaying, under control of said detecting of a selected first item, a second menu string of one or more selectable second items in a second coordinated direction on the screen transverse to said first coordinated direction, said second menu string intersecting the first menu string at the selected first item;

b. detecting user selection among the second items for activating an associated audio/video functionality; and c. displaying said first and second items in a bulletized manner while annotating by supporting indicativity.

2. A method as claimed in claim 1, characterized in that said method further comprises detecting a further user selection of one of said first items, and thereupon repeating the steps a through c in a hierarchical manner with respect to any further selectable item and with respect to an associated direction.

3. A method as claimed in claim 1, characterized in that said method comprises maintaining a display of any earlier selected item, while hiding nonselected first or second items among which a said selection had been performed.

4. A method as claimed in claim 1, characterized in that said method comprises displaying a particular item in the form of a puck, that contains up to four sub-items that may are each configured to selectively be "pushed away" upon user-actuation of the item in question for then joining further information to the actuated item, and enabling a further selecting or actuating by a user.

5. A method as claimed in claim 1, wherein user control functionality for a plurality of said audio/video set categories has been distributed over four successive levels containing Remote Control Elements, On-Screen Buttons, Primary Menu Items and Secondary Menu Items.

6. A method as claimed in claim 1, while furthermore blocking a user from navigating to any item other than those actually visible, while upon detecting cursor actuation in a slanted direction, driving it to an item that is closest within an angular region associated to that direction.

7. A method as claimed in claim 1, wherein an excess length of a menu string caused by Secondary Menu Items outside a predetermined screen area is indicated by a terminal "more" item of the string in question in a superbulletized manner.

8. A method as claimed in claim 1, wherein specifying of a scalable quantity associated to a selected string item is indicated on a slider item or bar item adjoining the selected first item.

9. A method as claimed in claim 1, wherein the display of a string that intersects a higher hierarchical level at a selected item is being dynamically unrolled in a gradual manner.

10. An audio/video set arranged for practicing a method as claimed in claim 1.

11. A set as claimed in claim 9 that is screen-based.

* * * * *